US012750224B2

(12) United States Patent
Seaborn et al.

(10) Patent No.: US 12,750,224 B2
(45) Date of Patent: Sep. 29, 2026

(54) TOKEN-BASED REMOTE LOGIN USING ATTRIBUTE-BASED ENCRYPTION

(71) Applicant: INTERNATIONAL BUSINESS MACHINES CORPORATION, Armonk, NY (US)

(72) Inventors: Mark Duane Seaborn, Algonquin, IL (US); Patrick Aaron Tamborski, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/345,060

(22) Filed: Jun. 30, 2023

(65) Prior Publication Data

US 2025/0007717 A1 Jan. 2, 2025

(51) Int. Cl.
*H04L 29/06* (2006.01)
*H04L 9/32* (2006.01)
*H04L 67/141* (2022.01)

(52) U.S. Cl.
CPC .......... *H04L 9/3213* (2013.01); *H04L 67/141* (2013.01)

(58) Field of Classification Search
None
See application file for complete search history.

(56) References Cited

U.S. PATENT DOCUMENTS 10,880,295 B2 12/2020 Teiste
11,082,424 B2 8/2021 D'Souzaet al.
2012/0011578 A1* 1/2012 Hinton ................ H04L 63/0815 726/8
2014/0020078 A1* 1/2014 Canning ............ H04L 63/0884 726/8
2022/0208319 A1* 6/2022 Ansari ................... G16H 10/60

FOREIGN PATENT DOCUMENTS

WO 2022144024 A1 7/2022

OTHER PUBLICATIONS

Divya et al., Secure Data Sharing in Cloud Environment Using Multi Authority Attribute Based Encryption, Proceedings of International Conference on Global Innovations in Computing Technology (ICGICT'14) 2014, 8 pages.

(Continued)

*Primary Examiner* — Andrew J Steinle

(57) ABSTRACT

An approach is provided for token-based authorization for a remote login using attribute-based encryption (ABE). A request from a Secure Shell Protocol (SSH) client is received for establishing a session between the SSH client and a SSH server. A message is sent from the SSH server indicating the SSH client is required to obtain an ABE token. Responsive to sending a request for creating the ABE token, creating the ABE token by a token service (TS), receiving the ABE token from the TS, and sending the ABE token to the SSH server, the ABE token is received by the SSH server from the SSH client. The SSH server determines that the ABE token can be used to successfully decrypt an encrypted blob associated with a set of attributes of the SSH server. In response, the SSH server authorizes the session and an establishment of the session is completed.

20 Claims, 5 Drawing Sheets

(56) References Cited

OTHER PUBLICATIONS

Authors et al.: Disclosed Anonymously, A System for Using Attribute-Based Encryption Artifacts for JSON Web Tokens, IP.com No. IPCOM000271024D, IP.com Electronic Publication Date: Sep. 29, 2022, 5 pages.
Bhuse et al., A Survey Report on Attribute Based Encryption Methodologies to Secure Cloud Storage, IJIRST—International Journal for Innovative Research in Science & Technology| vol. 3 | Issue 10 | Mar. 2017, 6 pages.
Fun et al., Attribute based encryption—A data centric approach for securing internet of things (IoT), Advanced Science Letters 23.5 (2017): 4219-4223.
Rajeb et al., Formal Analyze of a Private Access Control Protocol to a Cloud Storage. 14th International Conference on Security and Cryptography SECRYPT 2017. SCITEPRESS—Science and Technology Publications, 2017, 8 pages.
Ruj et al., DACC: Distributed access control in clouds. 2011IEEE 10th International Conference on Trust, Security and Privacy in Computing and Communications. IEEE, 2011, 8 pages.

* cited by examiner

TOKEN-BASED REMOTE LOGIN USING ATTRIBUTE-BASED ENCRYPTION

BACKGROUND

The present invention relates to security protocols and algorithms, and more particularly to token-based authorization for a remote login.

Secure Shell Protocol (SSH) is a cryptographic protocol used to operate services over an unsecured network. One common usage of SSH is to provide a secure way for a computer to login to a remote network resource and execute commands on the remote network resource. SSH supports multiple ways for users to login, including using asymmetric SSH keys or a password-based authentication that utilizes the users known locally to the remote network resource.

OAuth 2.0 is a protocol that allows a user to authorize access to user-owned data on one site to a third party site. The OAuth 2.0 protocol for the aforementioned access authorization is employed in several data processing use cases (e.g., printing a photo that the user stores in cloud storage and running analytics against data stored in data lakes). OpenID Connect (OIDC) is a thin identity layer (i.e., authentication layer) that is on top of the OAuth 2.0 authorization framework and is used to verify the identity of a user who is trying to access a protected endpoint.

Attribute-based encryption (ABE) is an encryption mechanism in which keys and ciphertext are dependent upon attributes.

SUMMARY

In one embodiment, the present invention provides a computer system that includes one or more computer processors, one or more computer readable storage media, and computer readable code stored collectively in the one or more computer readable storage media. The computer readable code includes data and instructions to cause the one or more computer processors to perform operations. The operations include receiving, by the SSH server, a request from a SSH client for an establishment of a session between the SSH client and the SSH server. The operations further include receiving, by the SSH server, a request from a SSH client for an establishment of a session between the SSH client and the SSH server. The operations further include sending, by the SSH server, a redirect message to the SSH client indicating that token-based authorization is supported and the SSH client is required to obtain an attribute-based encryption (ABE) token which is required for the establishment of the session, and which is configured as an ABE key to encode a set of attributes of the SSH server and for usage in attempting to decrypt encrypted blobs associated with respective sets of attributes of the SSH server. The operations further include, in response to a sending of a request from the SSH client to a token service (TS) for a creation of the ABE token, a creation of the ABE token by the TS, a receipt by the SSH client of the ABE token from the TS, and a sending of the ABE token from the SSH client to the SSH server subsequent to the receipt by the SSH client, receiving, by the SSH server, the ABE token from the SSH client. The operations further include determining, by the SSH server, that the ABE token can be used to successfully decrypt an encrypted blob included in the encrypted blobs. The operations further include, in response to the determining that the ABE token can be used to successfully decrypt the encrypted blob, granting, by the SSH server, an authorization of the establishment of the session and completing the establishment of the session.

A computer program product and a method corresponding to the above-summarized computer system are also described herein.

DETAILED DESCRIPTION

Overview

Figure 1:
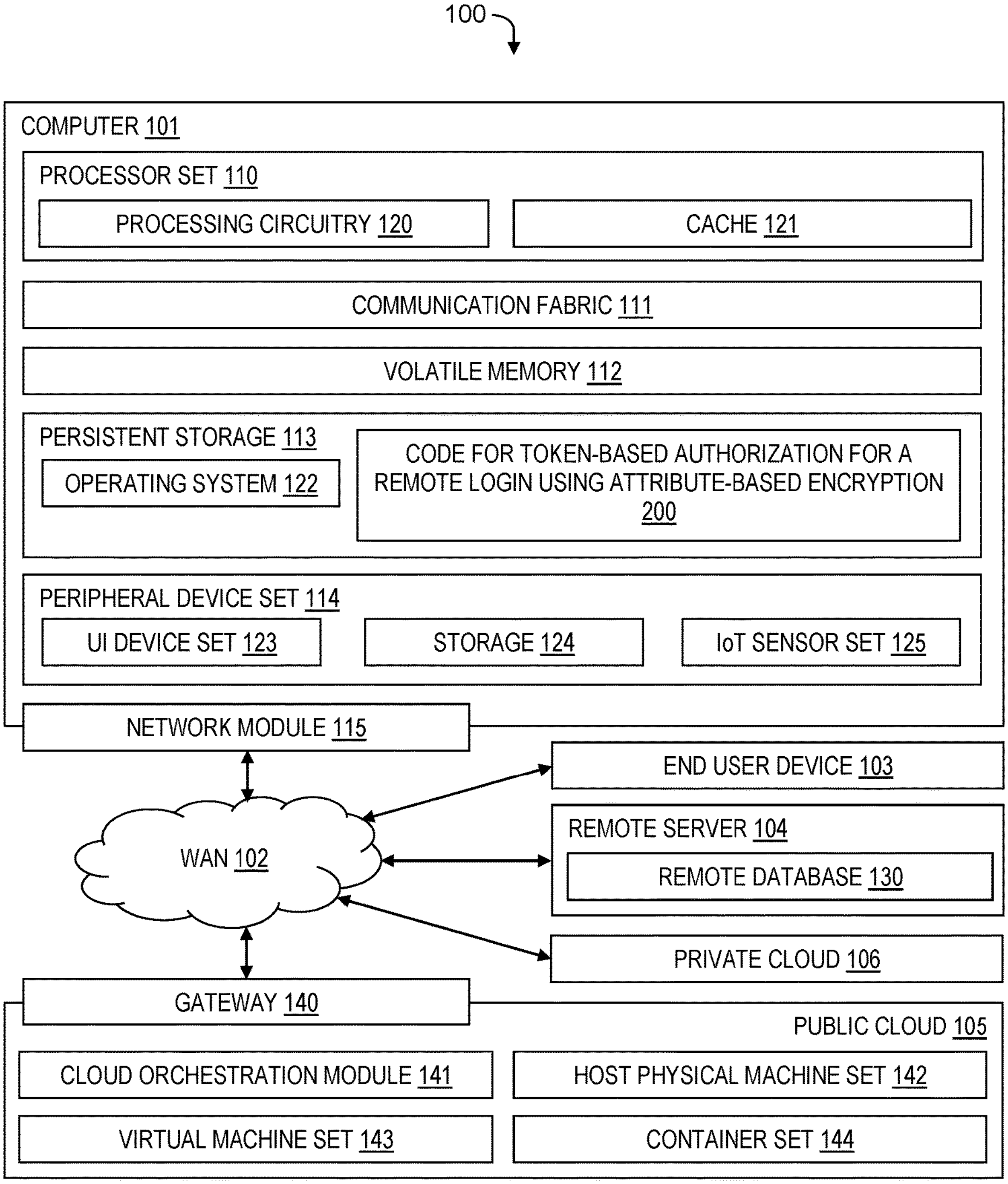
FIG. 1 is a block diagram of a system for token-based authorization for a remote login using ABE, in accordance with embodiments of the present invention.

Third party data breaches are common and result in the unauthorized access of sensitive information of an organization, such as passwords and other personal information, which may be used by a malicious actor to perform more targeted cyber attacks directly against the organization. The malicious actor may initially target information systems of the third party because the third party does not have a security posture that is as strong as the organization's. Furthermore, in known systems, user access control information for an enterprise is in a database in cleartext in a very large monolithic application, whose management requires a significant number of administrators. If that monolithic application is moved to a third party hosting service, a third party breach can result in a malicious actor obtaining all the access control information of the organization.

Embodiments of the present invention address the aforementioned unique challenges by providing a token-based authorization for remote login using ABE, which merges concepts from SSH, OAuth 2.0 and ABE so that SSH authentication is achieved via ABE keys by using a flow similar to the resource owner-based password credential flow in an OAuth 2.0 platform.

In one embodiment, using ABE, there is a trusted authority (e.g., a microservice or a monolithic application) which provisions keys to message producers along with all the necessary public parameters. In one embodiment, an OAuth 2.0 authorization server is a trusted server used to generate a token. A token service (TS) described below can be provided by the OAuth 2.0 authorization server. An OAuth 2.0 Relying Party (RP) is a service or application that requests a token on behalf of an end user. In other embodiments, a SSH client replaces the RP.

Those skilled in the art will recognize that OAuth 2.0 is merely one example of a protocol that the token-based remote login approach disclosed herein can use. Any authorization or authentication protocol in which tokens are used can replace OAuth 2.0, where the tokens are ABE keys or ciphertext. In one embodiment, the token-based remote login approach disclosed herein employs key-policy attribute-based encryption (KP-ABE). In another embodiment, the token-based remote login approach disclosed herein employs ciphertext-policy attribute-based encryption (CP-ABE).

In one embodiment, the TS is provisioned with the necessary master ABE keys. The TS creates tokens (i.e., ABE tokens) that include ABE keys. The ABE token includes encoded attributes of a remote service. In other embodiments, a SSH server (i.e., remote SSH server) replaces the remote service. In an OAuth 2.0 implementation, the SSH server acts as the resource server. The attributes in the ABE token can be, for example, network, location, platform, or other metadata negotiated between the RP and the TS. In one embodiment, the TS encodes the relevant human-readable identity of the remote service in the ABE token (i.e., the interface or hostname).

Embodiments of the present invention enhance the SSH protocol or provide an improved authentication method at the SSH protocol level or any authentication protocol by employing an encrypted payload. Embodiments of the present invention provide an improvement to a conventional resource owner-based password credential type approach by replacing the passwords in the conventional approach with ABE keys on SSH.

In one embodiment, the token-based authorization for remote login disclosed herein allows access rules and policies of an enterprise to be hidden and protected at the hosting service's data center, so that a breach of that data center does not provide a malicious actor with any access control information about the enterprise. Furthermore, the token-based authorization approach disclosed herein allows for the access control information of an enterprise to be broken into decentralized microservices, where each microservice services only a specific portion of the enterprise, thereby eliminating the need for a single, large, centralized application that includes all the access control information about the enterprise.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for token-based authorization for a remote login using ABE, in accordance with embodiments of the present invention. Computing environment 100 contains an example of an environment for the execution of at least some of the computer code involved in performing the inventive methods, such as code 200 for dynamic and automatic playbook generation using contextual network responses. The aforementioned computer code is also referred to herein as computer readable code, computer readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

System and Process for Token-Based Authorization for a Remote Login Using Abe

Figure 2:
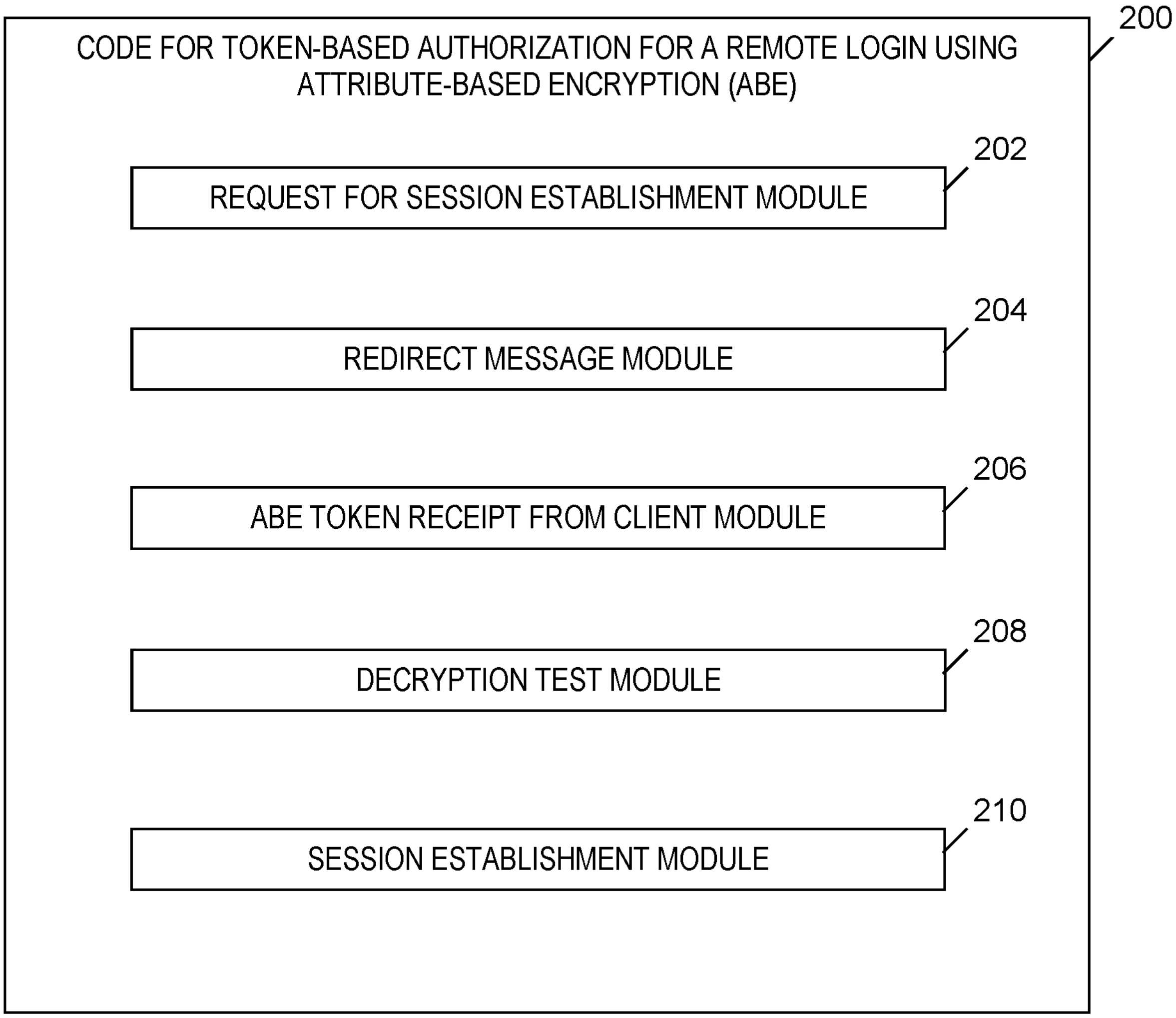
FIG. 2 is a block diagram of modules included in code included in the system of FIG. 1, in accordance with embodiments of the present invention.

FIG. 2 is a block diagram of modules included in code 200 included in the system of FIG. 1, in accordance with embodiments of the present invention. Code 200 includes a request for session establishment module 202, a redirect message module 204, an ABE token receipt from client module 206, a decryption test module 208, and a session establishment module 210. Session establishment module 202 is configured to receive a request from a SSH client to establish a session between the SSH client and a SSH server, which is computer 101 in FIG. 1 or is included in computer 101. The session is a remote connection between the SSH client and the SSH server.

Redirect message module 204 is configured to send a redirect message to the SSH client. The redirect message indicates that token-based authorization is supported by the SSH server and the SSH client is required to obtain an ABE token, which is required for establishing the requested session between the SSH client and the SSH server. The ABE token is configured to include an ABE key, which encodes a set of attributes of the SSH server and is used to attempt to decrypt encrypted policy blobs (i.e., metadata) associated with respective sets of attributes of the SSH server, where each set of attributes specifies an access control policy for remotely accessing the SSH server. As used herein, a blob is defined as a binary large object.

ABE token receipt from client module 206 is configured to receive the ABE token from the SSH client in response to sending a request from the SSH client to a token service (TS) for a creation of the ABE token, a creation of the ABE token by the TS, a receipt by the SSH client of the ABE token from the TS, and a sending of the ABE token from the SSH client to the SSH server subsequent to the receipt of the ABE token by the SSH client.

Decryption test module 208 is configured to test the ABE token that is received by the SSH server by an execution of ABE token receipt from client module 206. Testing the ABE token includes determining whether the ABE token can be used to successfully decrypt an encrypted policy blob associated with one of the aforementioned sets of attributes. In one embodiment, testing the ABE token determines whether or not attributes hidden in the ABE key included in the ABE token match the access policy in an encrypted policy blob.

Session establishment module 210 is configured to grant an authorization of the establishment of the session between the SSH client and the SSH server, and to complete the establishment of the session between the SSH client and the SSH server. The granting of the authorization and the completing of the establishment of the session are performed in response to determining that the ABE token can be used to successfully decrypt the encrypted policy blob by an execution of decryption test module 208.

Although not shown in FIG. 2, a token rejection module included in code 200 is configured to reject an ABE token and prevent an establishment of the session between the SSH client and the SSH server. The rejection of the ABE token and the prevention of the establishment of the session are performed in response to determining that the ABE token cannot be used to successfully decrypt any of the encrypted policy blobs associated with the aforementioned sets of attributes by an execution of decryption test module 208.

The encrypted policy blobs store access policies which are used in tests against an ABE key to determine whether the SSH client is authorized to access the SSH server, as described above. The token-based remote login approach disclosed herein employs the encrypted policy blobs to keep the access policies hidden and ensuring that the sets of attributes do not become exposed to an unauthorized party. Hereinafter, the encrypted policy blobs are referred to simply as encrypted blobs.

The functionality of the modules included in code 200 is described in more detail in the discussions presented below relative to FIG. 3, FIG. 4, and FIG. 5. In other embodiments, the SSH client and the SSH server described above in the discussion of FIG. 2 can be replaced by a Relying Party and a remote service, respectively.

Figure 3:
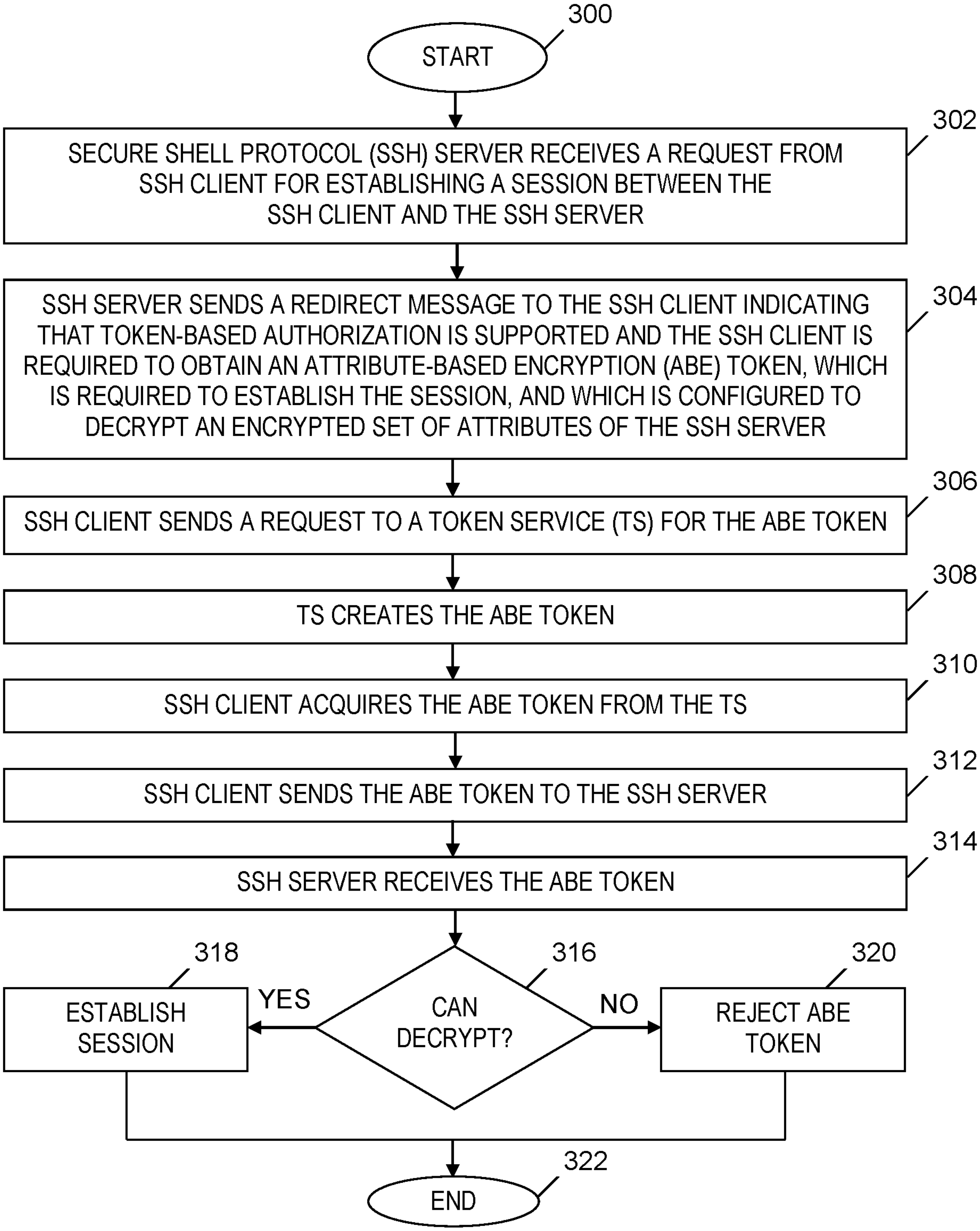
FIG. 3 is a flowchart of a process of token-based authorization for a remote login using ABE, where operations of the flowchart are performed by the modules in FIG. 2, in accordance with embodiments of the present invention.

FIG. 3 is a flowchart of a process of token-based authorization for a remote login using ABE, where operations of the flowchart are performed by the modules in FIG. 2, in accordance with embodiments of the present invention. The process of FIG. 3 begins at a start node 300. In step 302, request for session establishment module 202 receives a request from a SSH client for an establishment of a session between the SSH client and the SSH server. In the discussion of FIG. 3, the SSH client and SSH server that are part of the session whose establishment is requested in step 302 are referred to simply as "the SSH client" and "the SSH server," respectively.

In step 304, redirect message module 204 sends a redirect message to the SSH client. The redirect message indicates that token-based authorization is supported by the SSH server and the SSH client is required to obtain an ABE token, which is required for the establishment of the session, and which is configured as an ABE key to encode a set of attributes of the SSH server and for usage in attempting to decrypt encrypted blobs associated with respective sets of attributes of the SSH server. Each set of attributes specifies an access control policy for remote access of the SSH server.

In step 306, the SSH client sends to a token service (TS) a request for the ABE token to be created and sent to the SSH client. In one embodiment, the TS is provided by a trusted server that is mutually agreed upon by the SSH client and the SSH server.

In step 308, the TS creates the ABE token which was requested in step 306. In step 310, the SSH client acquires the ABE token from the TS. In one embodiment, the SSH client and the TS have an out-of-band mechanism that provisions an encrypted blob for the SSH server and provisions other encrypted blob(s) for respective other SSH server(s) prior to the process of FIG. 3. The SSH client validates that the acquired ABE token is meant to be sent to the SSH server by using the encrypted blob that was provisioned for the SSH server.

In one embodiment, step 306 described above includes the SSH client retrieving user credentials (e.g., username and password) and sending the user credentials to the TS, and step 310 is performed in response to sending the user credentials to the TS and the TS receiving the user credentials. Alternatively, the aforementioned user credentials can be replaced by credentials of the SSH client. Other credentials that could be used in step 306 include an application programming interface (API) key or the private key part of a public-private key pair.

In step 312, the SSH client sends the ABE token acquired in step 310 to the SSH server. In step 314, ABE token receipt from client module 206 receives the ABE token from the SSH client. Receiving the ABE token in step 314 is performed in response to sending the request in step 306, creating the ABE token in step 308, acquiring the ABE token in step 310, and sending the ABE token in step 312.

In step 316, decryption test module 208 tests the ABE token. The testing of the ABE token includes determining whether the ABE token can be used to successfully decrypt an encrypted blob included in the aforementioned encrypted blobs. If decryption test module 208 in step 316 determines that the ABE token successfully decrypts the encrypted blob, then the Yes branch of step 316 is followed and step 318 is performed. In step 318, session establishment module 210 grants an authorization of the establishment of the session between the SSH client and the SSH server and completes the establishment of the session.

Returning to step 316, if decryption test module 208 determines that the ABE token cannot be used to successfully decrypt the encrypted blob, then the No branch of step 316 is followed and step 320 is performed. In step 320, a token rejection module included in code 200 (but not shown in FIG. 2) rejects the ABE token and prevents the establishment of the session.

In one embodiment, the SSH server performs steps 302, 304, 314, 316, 318, and 320.

Following step 318 and step 320, the process of FIG. 3 ends at an end node 322. In other embodiments, the SSH client and the SSH server described above in the discussion of FIG. 3 can be replaced by a Relying Party and a remote service, respectively.

In one embodiment, the process of FIG. 3 further includes provisioning and storing encrypted blobs in the SSH server, where the encrypted blobs are associated with respective sets of one or more attributes of the SSH server. Each set of attributes specifies authorization criteria for authorizing the establishment of the session between the SSH client and the SSH server. The SSH server tests whether the ABE token can be used to successfully decrypt any of the encrypted blobs, where a result of the test is determining whether or not the ABE token can be used to successfully decrypt the encrypted blob described in step 316.

In one embodiment, the process of FIG. 3 further includes provisioning and storing encrypted blobs in the SSH server, where the encrypted blobs are associated with respective groups of users who expect to be granted access to the SSH server. Using the ABE token, the SSH server decrypts a stored encrypted blob associated with a group. The stored encrypted blob is included in the aforementioned stored encrypted blobs and the group is included in the aforementioned respective groups. In response to decrypting the stored encrypted blob, the SSH server verifies that a user is included in the group as a valid user and grants the user an access to the SSH server.

In an alternate embodiment, the process of FIG. 3 is modified to include provisioning the SSH server (or the TS) with a set of valid ABE keys (instead of encrypted blobs) for authorizing respective users to access the SSH server. The process of FIG. 3 is further modified to include provisioning the SSH client, in coordination with the TS, with a public ABE key for the SSH server and issuing an ABE token which is an ABE ciphertext, which includes an encryption of the SSH server and the SSH client, where the encryption is based on the public ABE key. The SSH server receives the ABE token from the SSH client. The SSH server determines that a valid ABE key included in the set of valid ABE keys successfully decrypts the encryption included in the ABE ciphertext. In response to determining that the valid ABE key successfully decrypts the encryption included in the ABE ciphertext, the SSH server grants an access to the SSH server by a user. The user to whom access is granted is included in the aforementioned respective users.

Figure 4:
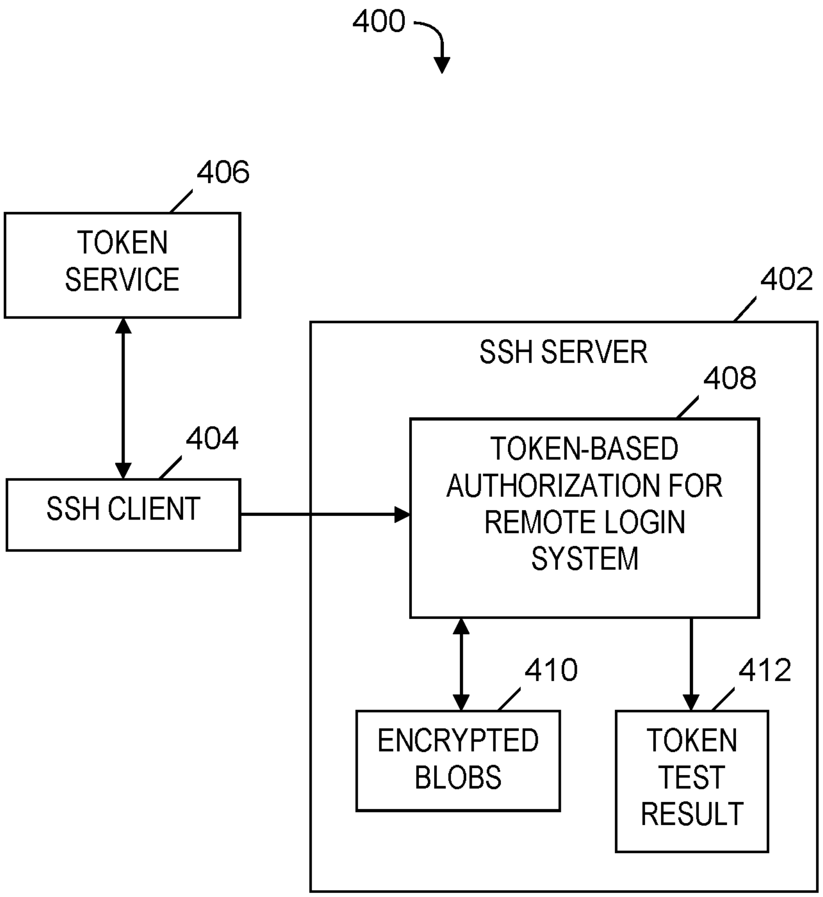
FIG. 4 is a block diagram of a system that implements the process of FIG. 3, in accordance with embodiments of the present invention.

FIG. 4 is a block diagram of a system 400 that implements the process of FIG. 3, in accordance with embodiments of the present invention. System 400 includes a SSH server 402, a SSH client 404, and a token service (TS) 406. SSH server 402 includes a software-based token-based authorization for remote login system 408, encrypted blobs 410, and a token test result 412.

SSH server 402 authorizes remote access to SSH server 402 by SSH client 404 by using sets of attributes of SSH server 402 that are associated with encrypted blobs 410 and by using ABE tokens generated by TS 406 and acquired by SSH client 404. The sets of attributes are embedded in ciphertext to hide the policies from any party that may have been able to penetrate the defenses of the services and acquire the encrypted metadata. SSH client 404 attempts to connect to SSH server 402. In one embodiment, the attempt to connect to SSH server 402 is included in step 302.

SSH server 402 sends an SSH auth message that indicates token-based authorization is supported by SSH server 402 and that SSH client is required to obtain an ABE token. In one embodiment, the aforementioned SSH auth message is sent in step 304.

SSH client 404 retrieves credentials (e.g., user credentials or RP credentials), sends the credentials to TS 406, and in response, TS 406 creates the ABE token and sends the ABE token to SSH client 404, and SSH client 404 acquires the ABE token from TS 406. In one embodiment, the credentials are retrieved and sent to TS 406 in step 306. In one embodiment, the creation of the ABE token is included in step 308. In one embodiment, the acquisition of the ABE token from TS 406 is included in step 310.

SSH client 404 sends the ABE token to token-based authorization for remote login system 408, which in response, receives the ABE token. In one embodiment, sending the ABE token to token-based authorization for remote login system 408 is included in step 312 and the receipt of the ABE token by token-based authorization for remote login system 408 is included in step 314.

In response to receiving the ABE token, token-based authorization for remote login system 408 tests the ABE token, which is a decryption key, against the encrypted blobs 410 for authorizing the remote access to SSH server 402. The test of the ABE token is a test using Boolean predicates within the encrypted blobs 410 and the result of the test is token test result 412. In one embodiment, the testing of the ABE token is included in step 316.

If token test result 412 indicates that token-based authorization for remote login system 408 successfully decrypts an encrypted blob included in encrypted blobs 410, then token-based authorization for remote login system 408 grants remote access to SSH server 402 by SSH client 404 and a session between SSH client 404 and SSH server 402 is established. In one embodiment, the establishment of the session is included in step 318.

If token test result 412 indicates that token-based authorization for remote login system 408 does not successfully decrypt any encrypted blob included in encrypted blobs 410, then token-based authorization for remote login system 408 rejects the ABE token and prevents the establishment of the session. In one embodiment, the rejection of the ABE token is included in step 320.

TS 406 can also provide authentication if blobs were provisioned per expected user.

Using a mechanism not shown in FIG. 4, sets of attributes of SSH server 402 (i.e., authorization criteria for remote access of SSH server 402) and encrypted blobs 410 are provisioned to SSH server 402. In a one-to-one correspondence, a given encrypted blob included in encrypted blobs 410 is associated with a given set of one or more attributes of SSH server 402 (i.e., associated with a given access policy). The provisioning of the sets of attributes is negotiated with TS 406. Examples of attributes include: (i) device platforms; (ii) networks; (iii) location; and (iv) availability of certain crypto algorithms.

In one embodiment, system 400 not only authorizes remote access to SSH server 402, but also authenticates a user based on an ABE token generated by token service 406 and acquired by SSH client 404. To implement authentication, system 400 includes encrypted blobs 410, where there is one blob per group or a blob per set of valid attributes. In this way, SSH server 402 has knowledge of which group the principal belongs to, but not the principal itself. In one embodiment, TS 406 determines group membership for users at authentication time. TS 406 places an attribute specifying the group into the ABE key as one of the attributes.

In other embodiments, another login service that achieves authorization and authentication replaces the SSH-based approach described above. The login service that replaces the SSH-based approach has features that allow a transmission of a token to a target service, where the token is an ABE key or ciphertext.

EXAMPLE

Figure 5:
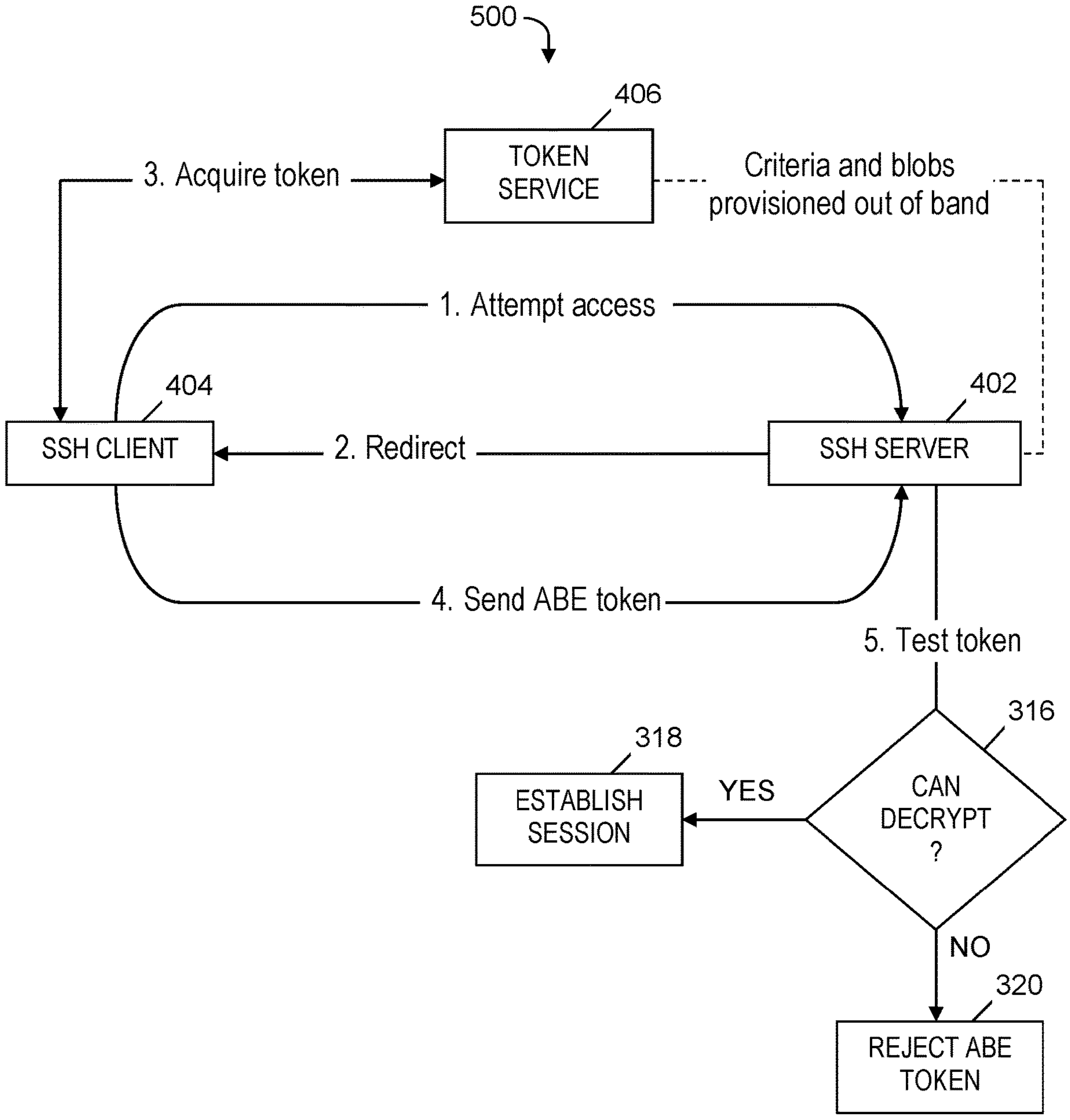
FIG. 5 is an example of the system of FIG. 4 implementing the process of FIG. 3, in accordance with embodiments of the present invention.

FIG. 5 is an example 500 of the system of FIG. 4 implementing the process of FIG. 3, in accordance with embodiments of the present invention. Example 500 includes a SSH server 402, SSH client 404, and a token service (TS) 406. Example 500 includes steps 1 through 5 of a process of token-based authorization for a remote login of SSH server 402 by SSH client 404. Example 500 further includes an out-of-band provisioning to SSH server 402 of (i) criteria for remotely accessing SSH server 402, where the criteria are specified by sets of one or more attributes of SSH server 402, and (ii) encrypted blobs associated with the sets of one or more attributes in a one blob-to-one set of attribute(s) correspondence.

In step 1, SSH client 404 sends to SSH server 402 a request, which is an attempt to access SSH server 402 via an establishment of a session between SSH client 404 and SSH server 402. The attempt to access SSH server 402 is included in step 302.

In step 2, SSH server 402 sends a redirect message to SSH client 404, which indicates that SSH server 402 supports token-based authorization and instructs SSH client 404 to obtain an ABE token, which is required to establish the session and which is configured to decrypt an encrypted blob associated with a set of attributes of SSH server 402. In Example 500, a set of attributes of SSH server 402 is associated with an encrypted blob and consists of a first attribute indicating that the device platform of a client must be XYZ and a second attribute indicating that the network of the client must be ABC in order for the client to be granted access to SSH server 402. The sending of the redirect message is included in step 304.

After step 2 and prior to step 3, SSH client 404 requests an ABE token from TS 406 and TS 406 generates the ABE token and sends the ABE token to SSH client 404. The SSH client 404 sending the request for the ABE token is included in step 306. The generation of the ABE token by TS 406 is included in step 308.

In step 3, SSH client 404 acquires the ABE token from TS 406. The acquisition of ABE token is included in step 310.

In step 4, SSH client 404 sends the ABE token to SSH server 402. The sending of the ABE token to SSH server 402 is included in step 312.

In step 5, SSH server 402 tests the ABE token in step 316 to determine if the ABE token can be used to successfully decrypt the encrypted blob associated with the first and second attributes described above. In a first performance of the steps in Example 500, the result of the test indicates that the ABE token can be used to successfully decrypt the encrypted blob, and in response to the result of the test, SSH server 402 establishes the session in step 318.

In a second performance of the steps in Example 500, the descriptions of the steps 1 through 5, described above, are modified so that the aforementioned request, session, redirect message, ABE token, and set of attributes are referred to as a second request, a second session, a second redirect message, a second ABE token, and a second set of attributes, respectively, The second ABE token is different from the ABE token used in the first performance of Example 500 and the second set of attributes is different from the set of attributes used in the first performance of Example 500.

In the second performance of the steps in Example 500, the result of the test in step 5 indicates that the second ABE token cannot be used to successfully decrypt any encrypted blob included in encrypted blobs 410 (see FIG. 4), and in response to the result of the test, SSH server 402 rejects the ABE token in step 320. The descriptions of the various embodiments of the present invention have been presented herein for purposes of illustration but are not intended to be exhaustive or limited to the embodiments disclosed. Many modifications and variations will be apparent to those skilled in the art. Accordingly, the appended claims are intended to encompass all such modifications and variations as fall within the true spirit and scope of the embodiments described herein.

What is claimed is:

1. A computer system comprising:

a Secure Shell Protocol (SSH) server;

one or more computer processors;

one or more computer readable storage media; and computer readable code stored collectively in the one or more computer readable storage media, with the computer readable code including data and instructions to cause the one or more computer processors to perform at least the following operations:

receiving, by the SSH server, a request from a SSH client for an establishment of a session between the SSH client and the SSH server;

sending, by the SSH server, a redirect message to the SSH client indicating that token-based authorization is supported and the SSH client is required to obtain an attribute-based encryption (ABE) token which is required for the establishment of the session, and which is configured as an ABE key to encode a set of attributes of the SSH server, and for usage in attempting to decrypt encrypted blobs associated with respective sets of attributes of the SSH server;

in response to a sending of a request from the SSH client to a token service (TS) for a creation of the ABE token, a creation of the ABE token by the TS, a receipt by the SSH client of the ABE token from the TS, and a sending of the ABE token from the SSH client to the SSH server subsequent to the receipt by the SSH client, receiving, by the SSH server, the ABE token from the SSH client;

determining, by the SSH server, that the ABE token can be used to successfully decrypt an encrypted blob included in the encrypted blobs; and in response to the determining that the ABE token can be used to successfully decrypt the encrypted blob, granting, by the SSH server, an authorization of the establishment of the session and completing the establishment of the session.

2. The computer system of claim 1, wherein the computer readable code including the data and the instructions causes the one or more computer processors to perform the following further operations:

storing, in the SSH server, the encrypted blobs associated with the respective sets of attributes of the SSH server, each set of attributes specifying authorization criteria for authorizing the establishment of the session; and testing, by the SSH server, whether the ABE token successfully decrypts any of the encrypted blobs, wherein the determining that the ABE token successfully decrypts the encrypted blob is a result of the testing.

3. The computer system of claim 1, wherein the computer readable code including the data and the instructions causes the one or more computer processors to perform the following further operations:

storing, by the SSH server, encrypted blobs in the SSH server, the encrypted blobs being associated with respective groups of users who expect to be granted access to the SSH server;

decrypting, by the SSH server and using the ABE token, a stored encrypted blob associated with a group, the stored encrypted blob being included in the encrypted blobs associated with the respective groups, and the group being included in the respective groups; and in response to the decrypting the stored encrypted blob, verifying, by the SSH server, that a user is included in the group as a valid user and granting the user an access to the SSH server.

4. The computer system of claim 1, wherein the computer readable code including the data and the instructions causes the one or more computer processors to perform the following further operations:

provisioning encrypted blobs for respective valid remote services, including an encrypted blob provisioned for a remote service;

acquiring, by the SSH client, the ABE token from the TS; and validating, by the SSH client, that the ABE token is associated with the remote service by using the provisioned encrypted blob, wherein the receiving the ABE token by the SSH server is performed further in response to the validating.

5. The computer system of claim 1, wherein the computer readable code including the data and the instructions causes the one or more computer processors to perform the following further operations:

receiving, by the SSH server, a second request from the SSH client for an establishment of a second session between the SSH client and the SSH server;

sending, by the SSH server, a second redirect message to the SSH client indicating that token-based authorization is supported and the SSH client is required to obtain a second ABE token which is required for the establishment of the second session, and which is configured to encode a second set of attributes of the SSH server and to attempt to decrypt the encrypted blobs;

in response to a sending of a request from the SSH client to the TS for a creation of the second ABE token, a creation of the second ABE token by the TS, a receipt by the SSH client of the second ABE token from the TS, and a sending of the second ABE token from the SSH client to the SSH server subsequent to the receipt by the SSH client of the second ABE token, receiving, by the SSH server, the second ABE token from the SSH client;

determining, by the SSH server, that the second ABE token does not decrypt any of the encrypted blobs; and in response to the determining that the second ABE token does not decrypt any of the encrypted blobs, rejecting, by the SSH server, the second ABE token and preventing, by the SSH server, the establishment of the second session.

6. The computer system of claim 1, wherein the computer readable code including the data and the instructions causes the one or more computer processors to perform the following further operations:

retrieving, by the SSH client, credentials of a user;

sending, by the SSH client, the credentials of the user to the TS; and in response to the sending the credentials of the user and a receipt of the credentials of the user by the TS, acquiring, by the SSH client, the ABE token from the TS, wherein the receiving the ABE token by the SSH server is performed in further response to the acquiring the ABE token.

7. The computer system of claim 1, wherein the computer readable code including the data and the instructions causes the one or more computer processors to perform the following further operations:

sending, by the SSH client, credentials of the SSH client to the TS; and in response to the sending the credentials of the SSH client and a receipt of the credentials of the SSH client by the TS, acquiring, by the SSH client, the ABE token from the TS, wherein the receiving the ABE token by the SSH server is performed in further response to the acquiring the ABE token.

8. A computer program product comprising:

one or more computer readable storage media having computer readable program code collectively stored on the one or more computer readable storage media, the computer readable program code being executed by one or more processors of a computer system to cause the computer system to perform at least the following operations:

receiving, by a Secure Shell Protocol (SSH) server included in the computer system, a request from a SSH client for an establishment of a session between the SSH client and the SSH server;

sending, by the SSH server, a redirect message to the SSH client indicating that token-based authorization is supported and the SSH client is required to obtain an attribute-based encryption (ABE) token which is required for the establishment of the session, and which is configured as an ABE key to encode a set of attributes of the SSH server and for usage in attempting to decrypt encrypted blobs associated with respective sets of attributes of the SSH server;

in response to a sending of a request from the SSH client to a token service (TS) for a creation of the ABE token, a creation of the ABE token by the TS, a receipt by the SSH client of the ABE token from the TS, and a sending of the ABE token from the SSH client to the SSH server subsequent to the receipt by the SSH client, receiving, by the SSH server, the ABE token from the SSH client;

determining, by the SSH server, that the ABE token can be used to successfully decrypt an encrypted blob included in the encrypted blobs; and in response to the determining that the ABE token can be used to successfully decrypt the encrypted blob, granting, by the SSH server, an authorization of the establishment of the session and completing the establishment of the session.

9. The computer program product of claim 8, wherein the computer readable program code being executed by the one or more processors of the computer system causes the computer system to perform the following further operations:

storing, in the SSH server, the encrypted blobs associated with the respective sets of attributes of the SSH server, each set of attributes specifying authorization criteria for authorizing the establishment of the session; and testing, by the SSH server, whether the ABE token successfully decrypts any of the encrypted blobs, wherein the determining that the ABE token successfully decrypts the encrypted blob is a result of the testing.

10. The computer program product of claim 8, wherein the computer readable program code being executed by the one or more processors of the computer system causes the computer system to perform the following further operations:

storing, in the SSH server, encrypted blobs associated with respective groups of users who expect to be granted access to the SSH server;

decrypting, by the SSH server and using the ABE token, a stored encrypted blob associated with a group, the stored encrypted blob being included in the encrypted blobs associated with the respective groups, and the group being included in the respective groups; and in response to the decrypting the stored encrypted blob, verifying that a user is included in the group as a valid user and granting the user an access to the SSH server.

11. The computer program product of claim 8, wherein the computer readable program code being executed by the one or more processors of the computer system causes the computer system to perform the following further operations:

provisioning encrypted blobs for respective valid remote services, including an encrypted blob provisioned for a remote service;

acquiring, by the SSH client, the ABE token from the TS; and validating, by the SSH client, that the ABE token is associated with the remote service by using the provisioned encrypted blob, wherein the receiving the ABE token by the SSH server is performed further in response to the validating.

12. The computer program product of claim 8, wherein the computer readable program code being executed by the one or more processors of the computer system causes the computer system to perform the following further operations:

receiving, by the SSH server, a second request from the SSH client for an establishment of a second session between the SSH client and the SSH server;

sending, by the SSH server, a second redirect message to the SSH client indicating that token-based authorization is supported and the SSH client is required to obtain a second ABE token which is required for the establishment of the second session, and which is configured to encode a second set of attributes of the SSH server and to attempt to decrypt the encrypted blobs;

in response to a sending of a request from the SSH client to the TS for a creation of the second ABE token, a creation of the second ABE token by the TS, a receipt by the SSH client of the second ABE token from the TS, and a sending of the second ABE token from the SSH client to the SSH server subsequent to the receipt by the SSH client of the second ABE token, receiving, by the SSH server, the second ABE token from the SSH client;

determining, by the SSH server, that the second ABE token does not decrypt any of the encrypted blobs; and in response to the determining that the second ABE token does not decrypt any of the encrypted blobs, rejecting, by the SSH server, the second ABE token and preventing, by the SSH server, the establishment of the second session.

13. The computer program product of claim 8, wherein the computer readable program code being executed by the one or more processors of the computer system causes the computer system to perform the following further operations:

retrieving, by the SSH client, credentials of a user;

sending, by the SSH client, the credentials of the user to the TS; and in response to the sending the credentials of the user and a receipt of the credentials of the user by the TS, acquiring, by the SSH client, the ABE token from the TS, wherein the receiving the ABE token by the SSH server is performed in further response to the acquiring the ABE token.

14. The computer program product of claim 8, wherein the computer readable program code being executed by the one or more processors of the computer system causes the computer system to perform the following further operations:

sending, by the SSH client, credentials of the SSH client to the TS; and in response to the sending the credentials of the SSH client and a receipt of the credentials of the SSH client by the TS, acquiring, by the SSH client, the ABE token from the TS, wherein the receiving the ABE token by the SSH server is performed in further response to the acquiring the ABE token.

15. A computer-implemented method comprising:

receiving, by one or more processors, a request from a Secure Shell Protocol (SSH) client for an establishment of a session between the SSH client and a SSH server;

sending, by the one or more processors, a redirect message to the SSH client indicating that token-based authorization is supported and the SSH client is required to obtain an attribute-based encryption (ABE) token which is required for the establishment of the session, and which is configured as an ABE key to encode a set of attributes of the SSH server and for usage in attempting to decrypt encrypted blobs associated with respective sets of attributes of the SSH server;

in response to a sending of a request from the SSH client to a token service (TS) for a creation of the ABE token, a creation of the ABE token by the TS, a receipt by the SSH client of the ABE token from the TS, and a sending of the ABE token from the SSH client to the SSH server subsequent to the receipt by the SSH client, receiving, by the one or more processors, the ABE token from the SSH client;

determining, by the one or more processors, that the ABE token can be used to successfully decrypt an encrypted blob included in the encrypted blobs; and in response to the determining that the ABE token can be used to successfully decrypt the encrypted blob, granting, by the one or more processors, an authorization of the establishment of the session and completing, by the one or more processors, the establishment of the session.

16. The method of claim 15, further comprising:

storing, by the one or more processors and in the SSH server, the encrypted blobs associated with the respective sets of attributes of the SSH server, each set of attributes specifying authorization criteria for authorizing the establishment of the session; and testing, by the one or more processors, whether the ABE token successfully decrypts any of the encrypted blobs, wherein the determining that the ABE token successfully decrypts the encrypted blob is a result of the testing.

17. The method of claim 15, further comprising:

storing, by the one or more processors and in the SSH server, encrypted blobs associated with respective groups of users who expect to be granted access to the SSH server;

decrypting, by the one or more processors and using the ABE token, a stored encrypted blob associated with a group, the stored encrypted blob being included in the encrypted blobs associated with the respective groups, and the group being included in the respective groups; and in response to the decrypting the stored encrypted blob, verifying, by the one or more processors, that a user is included in the group as a valid user and granting, by the one or more processors, the user an access to the SSH server.

18. The method of claim 15, further comprising:

provisioning, by the one or more processors, encrypted blobs for respective valid remote services, including an encrypted blob provisioned for a remote service;

acquiring, by one or more processors in a computer system that includes the SSH client, the ABE token from the TS; and validating, by the one or more processors in the computer system that includes the SSH client, that the ABE token is associated with the remote service by using the provisioned encrypted blob, wherein the receiving the ABE token by the SSH server is performed further in response to the validating.

19. The method of claim 15, further comprising:

receiving, by the one or more processors, a second request from the SSH client for an establishment of a second session between the SSH client and the SSH server;

sending, by the one or more processors, a second redirect message to the SSH client indicating that token-based authorization is supported and the SSH client is required to obtain a second ABE token which is required for the establishment of the second session, and which is configured to encode a second set of attributes of the SSH server and to attempt to decrypt the encrypted blobs;

in response to a sending of a request from the SSH client to the TS for a creation of the second ABE token, a creation of the second ABE token by the TS, a receipt by the SSH client of the second ABE token from the TS, and a sending of the second ABE token from the SSH client to the SSH server subsequent to the receipt by the SSH client of the second ABE token, receiving, by the one or more processors, the second ABE token from the SSH client;

determining, by the one or more processors, that the second ABE token does not decrypt any of the encrypted blobs; and in response to the determining that the second ABE token does not decrypt any of the encrypted blobs, rejecting, by the one or more processors, the second ABE token and preventing, by the one or more processors, the establishment of the second session.

20. The method of claim 15, further comprising:

retrieving, by one or more processors in a computer system that includes the SSH client, credentials of a user;

sending, by the one or more processors in the computer system that includes the SSH client, the credentials of the user to the TS; and in response to the sending the credentials of the user and a receipt of the credentials of the user by the TS, acquiring, by the one or more processors in the computer system that includes the SSH client, the ABE token from the TS, wherein the receiving the ABE token is performed in further response to the acquiring the ABE token.

* * * * *